United States Patent
Lee

(10) Patent No.: US 10,270,624 B2
(45) Date of Patent: Apr. 23, 2019

(54) CHANNEL ESTIMATION METHOD AND APPARATUS FOR USE IN WIRELESS COMMUNICATION SYSTEM

(71) Applicant: Samsung Electronics Co., Ltd, Gyeonggi-do (KR)

(72) Inventor: Dongjae Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 15/293,203

(22) Filed: Oct. 13, 2016

(65) Prior Publication Data

US 2017/0104611 A1 Apr. 13, 2017

(30) Foreign Application Priority Data

Oct. 13, 2015 (KR) ........................ 10-2015-0142565

(51) Int. Cl.
*H04L 25/02* (2006.01)
*H04B 7/0417* (2017.01)

(52) U.S. Cl.
CPC ...... *H04L 25/0228* (2013.01); *H04L 25/0256* (2013.01); *H04B 7/0417* (2013.01)

(58) Field of Classification Search
CPC ... H04B 7/0452; H04B 7/024; H04L 25/0202; H04N 19/97
See application file for complete search history.

(56) References Cited

U.S. PATENT DOCUMENTS

| | | | |
|---|---|---|---|
| 7,646,924 B2 | 1/2010 | Donoho | |
| 8,619,918 B2* | 12/2013 | Khojastepour | H04L 25/0204 370/334 |
| 8,852,103 B2* | 10/2014 | Rothberg | A61B 8/4254 600/438 |
| 8,855,190 B2* | 10/2014 | Tian | H04N 19/63 375/240.01 |
| 8,861,655 B1* | 10/2014 | Al-Naffouri | H04L 1/0054 375/341 |
| 8,863,044 B1* | 10/2014 | Casati | G06F 17/5072 716/106 |
| 9,154,337 B2* | 10/2015 | Thompson | H04L 25/0204 |

(Continued)

FOREIGN PATENT DOCUMENTS

| | | | | |
|---|---|---|---|---|
| WO | WO 2013058442 A1 * | 4/2013 | ............ | H04B 7/024 |
| WO | WO-2013058442 A1 * | 4/2013 | ............ | H04B 7/024 |
| WO | WO 2014058210 A1 * | 4/2013 | ............ | H04B 7/024 |

OTHER PUBLICATIONS

Donoho et al., "Sparse solution of undetermined systems of linear equations by stagewise orthogonal matching pursuit", IEEE Transactions on Information Theory, vol. 58, No. 2, Feb. 2012.*

(Continued)

*Primary Examiner* — Berhanu Tadese

(57) ABSTRACT

A channel estimation method includes receiving signals at Resource Elements (REs) designated for reference signals, converting the received signals to time-domain entries using a matched filter, organizing the entries output from the matched filter into groups by delay, determining whether an energy sum of the entries of each group is greater than a predetermined threshold, and selecting the entries belonging to the group of which the energy sum is greater than the threshold value into a candidate group for channel estimation.

18 Claims, 12 Drawing Sheets

(56) References Cited

U.S. PATENT DOCUMENTS

| | | | |
|---|---|---|---|
| 9,319,260 B2* | 4/2016 | Thompson | H04L 25/0212 |
| 9,386,465 B2* | 7/2016 | Forenza | H04B 7/0626 |
| 9,686,102 B2* | 6/2017 | Annavajjala | H04L 25/0206 |
| 9,819,403 B2* | 11/2017 | Forenza | H04B 7/01 |
| 9,826,537 B2* | 11/2017 | Forenza | H04B 17/318 |
| 2004/0264585 A1* | 12/2004 | Borran | H04L 5/0007 |
| | | | 375/260 |
| 2005/0249181 A1* | 11/2005 | Vijayan | H04L 5/0048 |
| | | | 370/344 |
| 2006/0018411 A1* | 1/2006 | Gore | H04L 25/0204 |
| | | | 375/340 |
| 2006/0029279 A1* | 2/2006 | Donoho | G06K 9/0057 |
| | | | 382/232 |
| 2006/0215539 A1* | 9/2006 | Vrcelj | H04L 25/0216 |
| | | | 370/208 |
| 2006/0221809 A1* | 10/2006 | Malladi | H04L 25/03012 |
| | | | 370/206 |
| 2007/0057718 A1* | 3/2007 | Coulson | H04B 1/76 |
| | | | 327/551 |
| 2011/0038407 A1* | 2/2011 | Ki | H04L 25/03305 |
| | | | 375/232 |
| 2011/0147593 A1* | 6/2011 | Nogueira-Nine | G01K 11/006 |
| | | | 250/358.1 |
| 2011/0222781 A1* | 9/2011 | Nguyen | G06K 9/6244 |
| | | | 382/218 |
| 2011/0228832 A1* | 9/2011 | De Francisco Martin | |
| | | | H04W 72/02 |
| | | | 375/224 |
| 2011/0273320 A1* | 11/2011 | Nogueira-Nine | G01K 11/006 |
| | | | 342/27 |
| 2013/0028341 A1* | 1/2013 | Ayach | H04B 7/0478 |
| | | | 375/267 |
| 2013/0094620 A1* | 4/2013 | Alexander | H04J 11/0063 |
| | | | 375/343 |
| 2014/0028442 A1* | 1/2014 | Yu | G06K 7/00 |
| | | | 340/10.1 |
| 2014/0099901 A1* | 4/2014 | Ruegamer | H04B 1/1027 |
| | | | 455/67.13 |
| 2014/0193076 A1* | 7/2014 | Gardiner | G06K 9/46 |
| | | | 382/190 |
| 2014/0245463 A1* | 8/2014 | Suryanarayanan | G06F 21/31 |
| | | | 726/28 |
| 2014/0269882 A1* | 9/2014 | Thompson | H04L 25/0212 |
| | | | 375/232 |
| 2015/0212176 A1* | 7/2015 | Lee | G01R 33/5619 |
| | | | 324/309 |
| 2015/0230766 A1* | 8/2015 | Wang | A61B 6/032 |
| | | | 600/411 |
| 2015/0280863 A1* | 10/2015 | Muqaibel | H04L 1/0048 |
| | | | 375/350 |
| 2015/0295733 A1* | 10/2015 | Annavajjala | H04L 25/0206 |
| | | | 375/260 |
| 2016/0191126 A1* | 6/2016 | Bose | H04B 7/0452 |
| | | | 370/329 |
| 2016/0203382 A1* | 7/2016 | Gardiner | G06K 9/4633 |
| | | | 382/190 |
| 2017/0010352 A1* | 1/2017 | Liu | G01S 13/89 |
| 2017/0104611 A1* | 4/2017 | Lee | H04L 25/0256 |
| 2017/0141936 A1* | 5/2017 | Lee | H04L 25/0202 |
| 2017/0257230 A1* | 9/2017 | Son | H04B 7/04 |
| 2018/0139629 A1* | 5/2018 | Chakrabarti | H04W 24/02 |

OTHER PUBLICATIONS

T. Tony Cai, et al., "Orthogonal Matching Pursuit for Sparse Signal Recovery With Noise", IEEE Transactios on Information Theory, vol. 57, No. 7, Jul. 2011, pp. 4680-4688.

David L. Donoho, et al., "Sparse Solution of Underdetermined Systems of Linear Equations by Stagewise Orthogonal Matching Pursuit", IEEE Transactions on Information Theory, vol. 58, No. 2, Feb. 2012, pp. 1094-1121.

* cited by examiner

CHANNEL ESTIMATION METHOD AND APPARATUS FOR USE IN WIRELESS COMMUNICATION SYSTEM

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2015-0142565, filed on Oct. 13, 2015, which is hereby incorporated by reference for all purposes as if fully set forth herein.

TECHNICAL FIELD

The present disclosure relates to a channel estimation method and apparatus for use in a wireless communication system. In particular, the present disclosure relates to a channel estimation method and apparatus for receiving Multi-Input Multi-Output (MIMO) signals.

BACKGROUND

In order to meet the growth in wireless data traffic demand since the commercialization of 4th Generation (4G) communication systems, many studies have been conducted to develop an enhanced 5G or pre-5G communication system. For this reason, the 5G or pre-5G communication system is also called a beyond-4G communication system or a post Long Term Evolution (LTE) system.

Consideration is being given to implementing the 5G communication system in millimeter wave (mm Wave) frequency bands (e.g., 28 GHz and 60 GHz bands) to accomplish higher data rates. In order to increase the propagation distance by mitigating propagation loss in the 5G communication systems, discussions are underway about various techniques such as beamforming, massive MIMO, Full Dimensional MIMO (FD-MIMO), array antenna, analog beamforming, and large scale antenna.

Also, in order to enhance network performance of the 5G communication systems, development is underway of various techniques such as evolved small cell, advanced small cell, cloud Radio Access Network (RAN), ultra-dense network, Device to Device (D2D) communication, wireless backhaul, moving network, cooperative communication, Coordinated Multi-Points (CoMP), and interference cancellation.

SUMMARY

To address the above-discussed deficiencies, it is a primary object to provide a channel estimation method and apparatus for use in a wireless communication system.

Also, the present disclosure aims to provide a channel estimation method and apparatus for receiving MIMO signals.

Also, the present disclosure aims to provide a method and apparatus for estimating channels based on Cell-specific Reference Signal (CRS) or Sounding Reference Signal (SRS) in a system using multiple antennas.

Also, the present disclosure aims to provide a channel estimation method and apparatus for receiving LTE downlink (DL) MIMO signals.

In accordance with an aspect of the present disclosure, a channel estimation method of a terminal is provided. The channel estimation method includes receiving signals at Resource Elements (REs) designated for reference signals, converting the received signals to time-domain entries using a matched filter, organizing the entries output from the matched filter into groups by delay, determining whether the energy sum of the entries of each group is greater than a predetermined threshold, and selecting the entries belonging to the group of which the energy sum is greater than the threshold value into a candidate group for channel estimation.

In accordance with another aspect of the present disclosure, a terminal is provided. The terminal includes a transceiver for transmitting and receiving signals and a control unit which controls receiving signals at REs designated for reference signals, converting the received signals to time-domain entries using a matched filter, organizing the entries output from the matched filter into groups by delay, determining whether the energy sum of the entries of each group is greater than a predetermined threshold, and selecting the entries belonging to the group of which the energy sum is greater than the threshold value into a candidate group for channel estimation.

In accordance with another aspect of the present disclosure, a non-transitory computer readable medium comprising program code, that when executed by at least one processor, causes the at least one processor to receive signals at resource elements (REs) designated for reference signals, convert the received signals to time-domain entries using a matched filter, organize entries output from the matched filter into groups by delay, determine whether an energy sum of entries of each group is greater than a first threshold, and select the entries belonging to a group of which the energy sum is greater than the first threshold into a candidate group for channel estimation.

The present disclosure is not limited to solving the aforementioned technical problems, and it aims to solve other problems that will be understood clearly to those skilled in the art from the following description of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 11 discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Exemplary embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure. This aims to omit unnecessary description so as to make the subject matter of the present disclosure clear.

An embodiment of the present disclosure is directed to a Compressed Sensing-based (CS-based) channel estimation method using CRS. However, the scope of the present disclosure is not limited thereto, and it may be possible to use other channel estimation schemes and/or other reference signals.

For example, the channel estimation method of the present disclosure may be used in a system where a base station estimates a channel using SRS transmitted by a terminal. In the case of using SRS, the terminal operations according to the embodiments of the present disclosure may be performed by the base station with SRS instead of CRS.

There may be clusters comprised of various scatterers or reflectors on a radio channel; thus, a receiver receives a signal through multiple paths. An LTE Downlink Orthogonal Frequency Division Multiplexing (LTE DL OFDM) symbol has a cyclic prefix (CP) preceding the net OFDM symbol; thus, a receiver may cancel Inter-Symbol Interference (ISI) by discarding the CP and taking samples equal in length to a fast Fourier transform (FFT) size.

In LTE, a subframe spans 1 ms and is comprised of a plurality of Physical Resource Blocks (PRBs). A PRB consists of 14 OFDM symbols in the time domain and 12 Resource Elements (REs). This means that 1 PRB consists of 168 REs.

In order to perform coherent demodulation, the base station can have a plurality of transmit antenna ports that are disjointedly associated with different CRSs. The LTE standard supports 1, 2, and 4 CRS antenna ports. A terminal (also referred to herein as "User Equipment" or "UE") can check a number of antenna ports of the base station in the course of demodulating a Physical Broadcast Channel (PBCH). If the FFT is performed on N FFT samples in the time domain after discarding the CP, it is possible to take a receive signal at specific REs to which the CRS is mapped in the frequency domain.

Figure 1A:
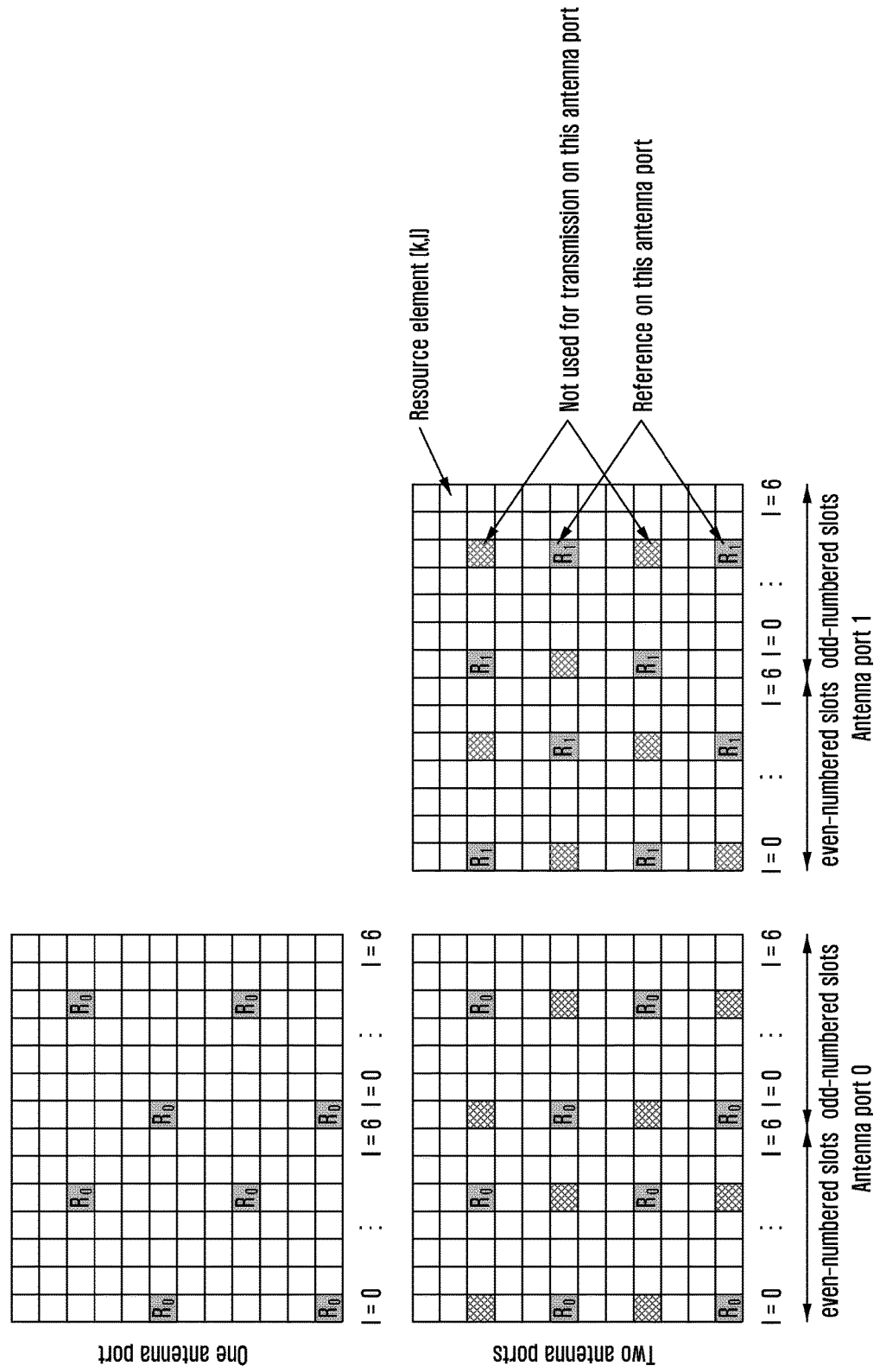
FIGS. 1A and 1B are diagrams illustrating resource grids with CRS REs in LTE according to an embodiment of the present disclosure.
Figure 1B:
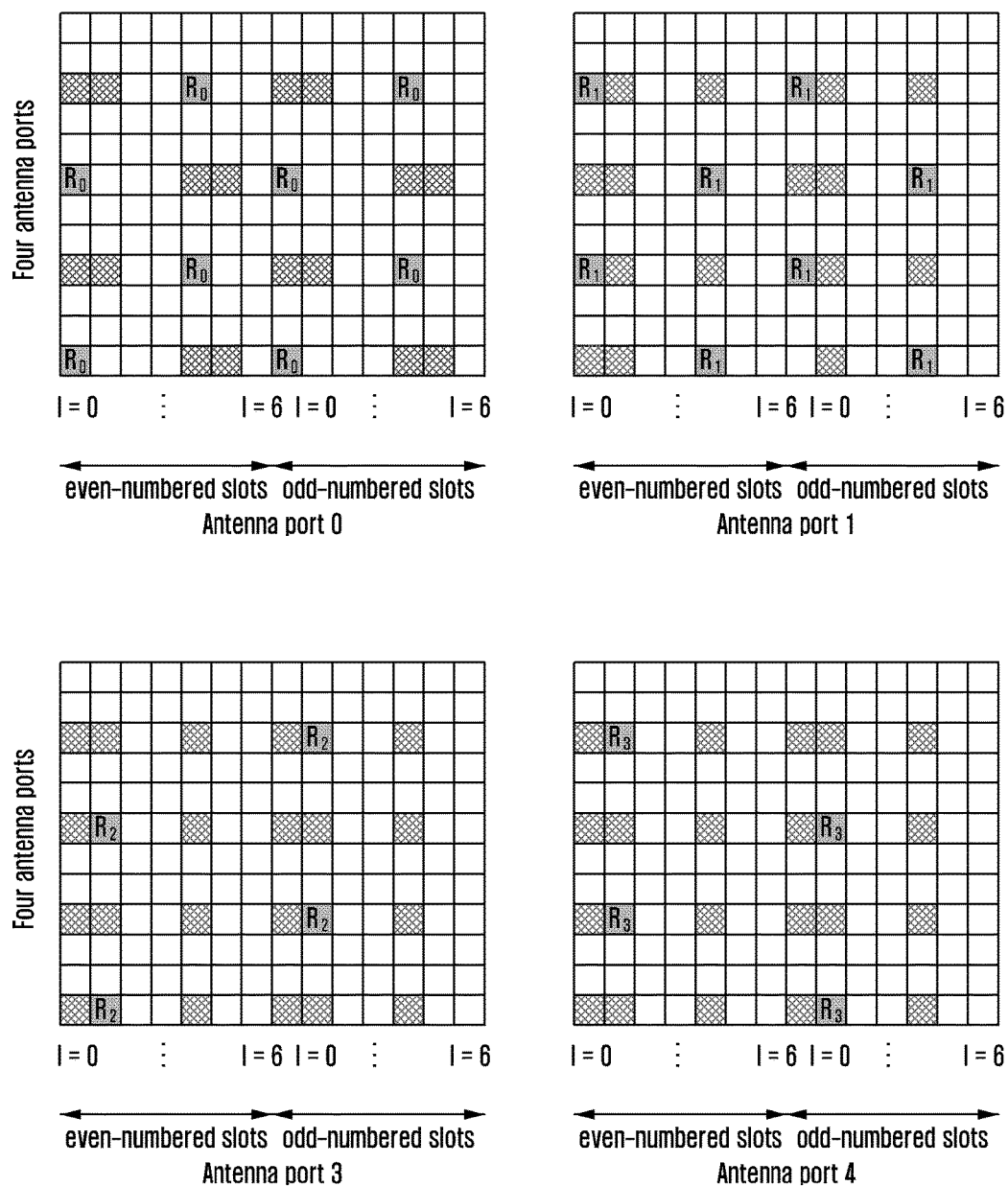

FIGS. 1A and 1B are diagrams illustrating resource grids with CRS REs in LTE. FIGS. 1A and 1B show the configurations of the CRS REs for 1, 2, and 4 antenna ports.

The length of the CP is set to be longer than the maximum multipath delay of the signal over a radio channel. In case of a normal CP, the 0th and 7th of the 17 OFDM symbols have a CP length of 5.208 micro second, while other OFDM symbols have a CP length of 4.6865 micro second. Assuming that the system bandwidth is 10 MHz, the chip (FFT sample) duration is 32.552 ns and, at this time, the two CP lengths correspond to 80 and 72 chips respectively. Among various channels experienced by a pedestrian, Enhanced Pedestrian A (EPA) and Pedestrian B (Ped. B) channels have delay spread values of 0.41 micro second and 3.7 micro second respectively, which are shorter than the length of the CP. The EPA and Ped. B channels are channels having 7 and 6 multiple paths, respectively. That is, the radio channels are configured to have the delay spreads shorter than the OFDM CP length and sparse channel taps. The channel that a signal experiences can be generated by combining a transmit filter of the base station, sparse radio channels, and a receive filter. The present disclosure assumes a channel that does not vary during one subframe.

The $l^{th}$ channel tap value h(l) of the receive signal sampled by an Analog-to-Digital Converter (ADC) is expressed as follows:

$$h(l) = \frac{1}{\sqrt{\kappa}} \sum_{i=0}^{L_0-1} \sum_{q=l_i}^{l_i+2n_0} a(i) \cdot g\left(q - n_0 - l_i - \frac{\varepsilon_i}{T_c}\right) \delta_{q-l}, \quad (1)$$

$$0 \leq l \leq L-1$$

where $L_0$ denotes a number of paths of sparse radio channels, and $T_c$ denotes a chip duration. a(i) denotes a coefficient of $i^{th}$ path, $\tau_i$ denotes delay on the $i^{th}$ path, and $l_i$ and $\varepsilon_i$ are defined as $l_i = \lfloor (\tau_i - \tau_0)/T_c \rfloor$ and $$\varepsilon_i \triangleq (\tau_i - \tau_{ii}) - l_i \cdot T_c$$

when $0 \leq \tau_0 < \tau_1 < \ldots < \tau_{L_0-1}$.

When a composite filter of the transmit and receive filters at time t is given as g(t), it is assumed that g(t) has a length of $(2n_0+1)T_c$. The delay spread L is expressed as $L=\lfloor(\tau_{L_0-1}-\tau_0)/T_c\rfloor+2n_0+1$. $\delta_q$ denotes the Kronecker delta. A component that the $l^{th}$ multipath contributes to the $i^{th}$ channel tap h(l) in view of the ADC sample space is $a(i)\cdot g(l-n_0-l_i-\varepsilon_i/T_c)$ when $q=l$ among $q=l_i, \ldots, l_i+2n_0$. In equation (1), $\kappa$ is a constant satisfying equation (2) when $$\sum_{i=0}^{L_0-1} E[|a(i)|^2] = 1.$$

$$\sum_{l=0}^{L-1} E[|h(l)|^2] = 1 \quad (2)$$

In equation (2), E denotes expectation. Since h(l) is expressed as a linear overlapping of $a_i$ in equation (1), if the vectors h and a are defined as $$h \triangleq [h(0) \ldots h(L-1)]^T \in \mathbb{C}^{L\times 1},$$
$$a \triangleq [a(0) \ldots a(L_0-1)]^T \in \mathbb{C}^{L_0\times 1}$$

respectively, equation (3) is derived as follows:

$$h = \Xi a \quad (3)$$

where $\Xi \in \mathbb{C}^{L\times L_0}$ denotes a leakage matrix and satisfies equation (1). The upper subscription T denotes a transpose operation. The $i^{th}$ path between the transmit antenna port u and the receive antenna v is defined as $a_{u,v}(i)$, and the $l^{th}$ channel tap seen in view of the ADC sample space is defined as $h_{u,v}(l)$.

Then equation (4) is derived from equation (3) with the definitions of $$h_{u,v} \triangleq [h_{u,v}(0) \ldots h_{u,v}(L-1)]^T \in \mathbb{C}^{L\times 1},$$
$$a_{u,v} \triangleq [a_{u,v}(0) \ldots a_{u,v}(L_0-1)]^T \in \mathbb{C}^{L_0\times 1}.$$

$$h_{u,v} = \Xi a_{u,v} \quad (4)$$

It can be possible to think of a receive signal at RE k to which CRS u is mapped in the OFDM symbol n transmitted from the transmit antenna port u, $u=0, \ldots, N_t-1$, to the receive antenna v, $v=0, \ldots, N_r-1$. Since the CRS values are known to both the base station and UE, the signal $y_v^{(u)}(n,k)$ obtained by dividing the receive signal by the CRS value can be expressed as follows:

$$y_v^{(u)}(n, k) = \sum_{l=0}^{L-1} h_{u,v}(l)e^{-j2\pi kl/N} + z_v^{(u)}(n, k) \quad (5)$$

where $z_v^{(u)}(n,k)$ denotes noise at RE k to which CRS u is mapped in the $n^{th}$ OFDM signal. Suppose that the total number of REs designated for CRS in OFDM symbol n is $N_{CRS}$, $z_v^{(u)}(n)\in\mathbb{C}^{N_{CRS}\times t}$ is a vector arranging noise signals in the ascending order within the frequency region where CRS u is located in the OFDM symbol n of the received antenna v and $y_v^{(u)}(n)\in\mathbb{C}^{N_{CRS}\times t}$ is a vector arranging receive signals in the ascending order within the frequency region where the CRS u is located in the OFDM symbol n of the receive antenna v, then, in the following equation:

$$y_v^{(u)}(n) = F_u(n)h_{u,v} + z_v^{(u)}(n) \quad (6)$$

and, assuming a matrix with an entry on the $m^{th}$ row and $m'^{th}$ column (m, m'=0, ..., N−1) is F, $F_u(n)$ is a submatrix comprised of the row vectors corresponding to the subcarrier indices and the column vectors 0 to L−1 at the RE positions, in the matrix F, to which CRS u is mapped in the OFDM symbol n. Thus, the size of $F_u(n)$ is $N_{CRS}\times L$. In FIG. 1B, CRS 0, CRS 1, CRS 2, and CRS 3 are mapped in 4, 4, 2, and 2 OFDM symbols, respectively; considering the subcarrier indices corresponding to the REs to which CRS 0, CRS 1, CRS 2, and CRS 3 are mapped, equations (7) and (8) are obvious.

$$F_0(0) = F_0(7) = F_1(4) = F_1(11) = F_2(1) = F_3(8) \triangleq F(0) \quad (7)$$

$$F_0(4) = F_0(11) = F_1(0) = F_1(7) = F_2(8) = F_3(1) \triangleq F(4) \quad (8)$$

The received signals at the REs to which CRS u received by the receive antenna v during one subframe are mapped are defined as $$y_v^{(u)} \triangleq \left[(y_v^{(u)}(0))^T, (y_v^{(u)}(4))^T, (y_v^{(u)}(7))^T, (y_v^{(u)}(11))^T\right]^T (u = 0, 1)$$

and $$y_v^{(u)} \triangleq \left[(y_v^{(u)}(1))^T, (y_v^{(u)}(8))^T\right]^T (u = 2, 3);$$

and the received signals at REs to which CRS u received by $N_r$ receive antennas are mapped are defined as $$y^{(u)}\left[(y_0^{(u)})^T, \ldots, (y_{N_r-1}^{(u)})^T\right]^T \in \mathbb{C}^{4N_{CRS}N_r\times 1}(u = 0, 1)$$

and $$y^{(u)} \triangleq \left[(y_0^{(u)})^T, \ldots, (y_{N_r-1}^{(u)})^T\right]^T \in \mathbb{C}^{2N_{CRS}N_r\times 1}(u = 2, 3).$$

Suppose that the receive signal at the REs to which $N_t$ CRSs received by $N_r$ receive antennas are mapped is $$y \triangleq \left[(y^{(0)})^T, \ldots, (y^{(N_t-1)})^T\right]^T,$$

the noise signals at the REs to which CRS u received by the receive antenna v during one subframe are mapped are defined as $$z_v^{(u)} \triangleq \left[(z_v^{(u)}(0))^T, (z_v^{(u)}(4))^T, (z_v^{(u)}(7))^T, (z_v^{(u)}(11))^T\right]^T (u = 0, 1)$$

and $$z_v^{(u)} \triangleq \left[(z_v^{(u)}(1))^T, (z_v^{(u)}(8))^T\right]^T (u = 2, 3)$$

and the noise signals at REs to which CRS u received by $N_r$ receive antennas are mapped are defined as $$z^{(u)} \triangleq [(z_0^{(u)})^T, \ldots, (z_{N_r-1}^{(u)})^T]^T \in \mathbb{C}^{4N_{CRS}N_r \times 1} (u = 0, 1)$$

and $$z^{(u)} \triangleq [(z_0^{(u)})^T, \ldots, (z_{N_r-1}^{(u)})^T]^T \in \mathbb{C}^{2N_{CRS}N_r \times 1} (u = 2, 3).$$

The noise signals at the REs to which $N_t$ CRSs received by $N_r$ receive antennas are defined as $$z \triangleq [(z^{(0)})^T, \ldots, (z^{(N_t-1)})^T]^T.$$

Assuming that the RE-specific noise signals are independent from each other and have the same variance, the noise variance of an entry of z can be defined as $\sigma_z^2$. The channels between transmit antenna u and $N_r$ receive antennas that are not changing during one subframe are defined as $$a_u \triangleq [a_{u,0}^T, \ldots, a_{u,N_r-1}^T]^T \in \mathbb{C}^{LN_r \times 1}.$$

Also, the channels between $N_t$ transmit antennas and $N_r$ receive antennas are defined as $$a \triangleq [a_0^T, \ldots, a_{N_t-1}^T]^T \in \mathbb{C}^{LN_tN_r \times 1}.$$

Since the multipaths are caused by different scatterers, they can be regarded as independent from each other. The channels between the transmit antenna u with transmit/receive filters and ADC and the $N_r$ receive antennas during one subframe are defined as $$h_u \triangleq [h_{u,0}^T, \ldots, h_{u,N_r-1}^T]^T \in \mathbb{C}^{LN_r \times 1}.$$

The channels between the $N_t$ transmit antennas with transmit/receive filters and ADC and the $N_r$ receive antennas are defined as $$h \triangleq [h_0^T, \ldots, h_{N_t-1}^T]^T \in \mathbb{C}^{LN_rN_t \times 1}.$$

$$h = (I_{N_tN_r} \otimes \Xi)a \quad (9)$$

where $I_{N_tN_r}$ denotes the identity matrix of size $N_tN_r \times N_tN_r$ and $\otimes$ denotes the Kronecker product.

The receive signal vector y is expressed as follows:

$$y = \Phi h + z \quad (10)$$

where $\Phi$ denotes a predetermined system matrix and z denotes noise.

In the case of $N_t=1$, the system matrix $\Phi \in \mathbb{C}^{4N_{CRS}N_r \times LN_r}$ is expressed as follows:

$$\Phi = I_{N_r} \otimes \left(1_{2 \times 1} \otimes \begin{bmatrix} F(0) \\ F(4) \end{bmatrix}\right) \quad (11)$$

where $1_{2 \times 1}$ denotes a 2×1 vector with all 1 entries.

Although the present disclosure has been described w
In the case of $N_t=2$, the system matrix $\Phi \in \mathbb{C}^{8N_{CRS}N_r \times 2LN_r}$ is expressed as follows:

$$\Phi = \begin{bmatrix} \Phi_0 & \\ & \Phi_1 \end{bmatrix} \quad (12)$$

$$\Phi_0 = I_{N_r} \otimes \left(1_{2 \times 1} \otimes \begin{bmatrix} F(0) \\ F(4) \end{bmatrix}\right) \quad (13)$$

$$\Phi_1 = I_{N_r} \otimes \left(1_{2 \times 1} \otimes \begin{bmatrix} F(4) \\ F(0) \end{bmatrix}\right) \quad (14)$$

In the case of $N_t=4$, the system matrix $\Phi \in \mathbb{C}^{32N_{CRS}N_r \times LN_r}$ is expressed as follows:

$$\Phi = \begin{bmatrix} \Phi_0 & & & \\ & \Phi_1 & & \\ & & \Phi_2 & \\ & & & \Phi_3 \end{bmatrix} \quad (15)$$

$$\Phi_2 = I_{N_r} \otimes \begin{bmatrix} F(0) \\ F(4) \end{bmatrix} \quad (16)$$

$$\Phi_3 = I_{N_r} \otimes \begin{bmatrix} F(4) \\ F(0) \end{bmatrix} \quad (17)$$

Assuming that the independent and identically distributed (i.i.d) entries of vector a have zero-mean normal distribution, the optimal channel estimation is expressed as equation (18).

$$\hat{h}_{LMMSE} = (I_{N_tN_r} \otimes \Xi)((I_{N_tN_r} \otimes \Xi^H)\Phi^H\Phi(I_{N_tN_r} \otimes \Xi) + \sigma_z^2 C_a^{-1})^{-1}(I_{N_tN_r} \otimes \Xi^H)\Phi^H y \quad (18)$$

where $C_a$ denotes a covariance matrix of vector a, and the upper subscript H is Hermitian. When the covariance matrices of vectors a and z are not given, the maximum likelihood (ML) can be estimated as equation (19).

$$\hat{h}_{ML} = (I_{N_tN_r} \otimes \Xi)((I_{N_tN_r} \otimes \Xi^H)\Phi^H\Phi(I_{N_tN_r} \otimes \Xi))^{-1} (I_{N_tN_r} \otimes \Xi^H)\Phi^H y \quad (19)$$

From both Equations (18) and (19), it is shown that the receiver knows the non-zero entry positions (called support of h) of $\Xi$ and h. Since the receiver cannot know how the transmit filter is created by the base station and check the non-zero entry positions of the channel tap in a noisy environment, it is almost impossible to implement an LMMSE estimator and ML estimator.

However, since the vector h is sparse (number of non-zero entries of h is called sparsity) as aforementioned, it is possible to achieve a performance close to that of the ML estimator by performing support recovery using a Compressed Sensing (CS) technique.

Descriptions are made hereinafter of an Orthogonal Matching Pursuit (OMP) algorithm and a stage-wise OMP (StOMP) as an enhanced version thereof that are representative CS techniques.

Figure 2:
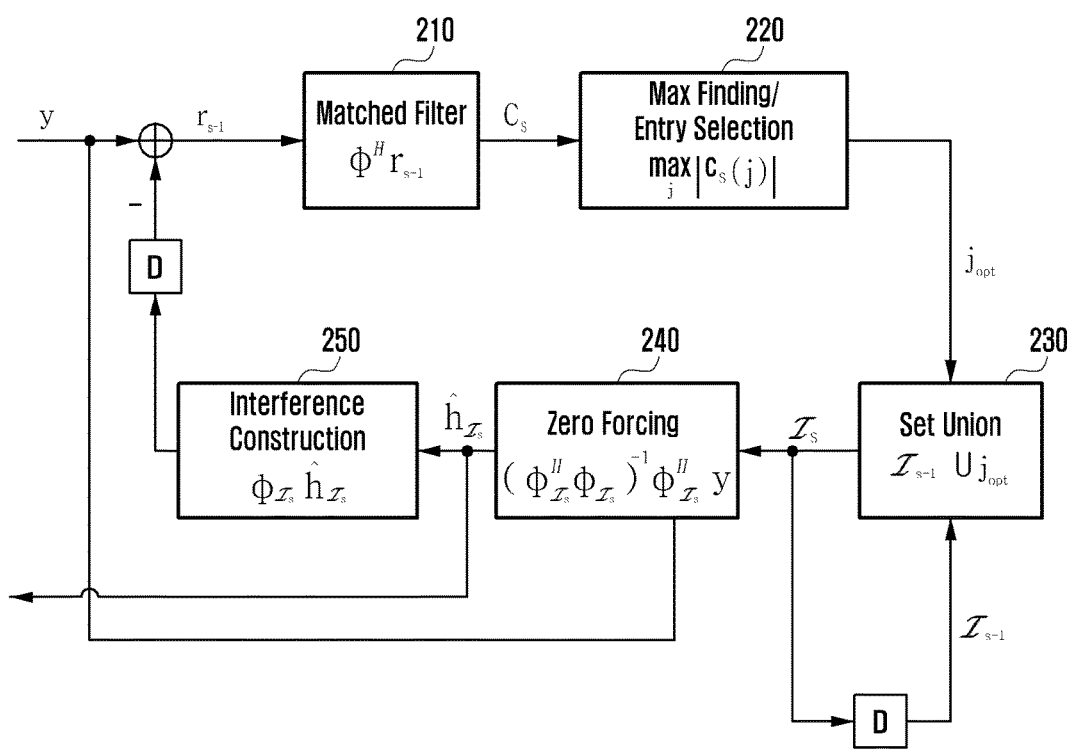
FIG. 2 is a circuit diagram illustrating an OMP operation according to an embodiment of the present disclosure.

FIG. 2 is a circuit diagram illustrating an OMP operation according to an embodiment of the present disclosure.

In reference to FIG. 2, a UE receives a signal from a base station at CRS RE positions, y denotes a received signal vector at the CRS REs, $r_{s-1}$ denotes a residual vector at the $s^{th}$ step, and $r_0=y$ and $I_0=\emptyset$ when s=1.

The UE can pass the received signal vector y or the residual vector of the received signal vector at a certain step through a matched filter to generate an output at step 210. The $j^{th}$ entry of the matched filter output $c_s$ of $r_{s-1}$ at the $s^{th}$ (≥1) step is an entry of indicating the matching degree between $r_{s-1}$ and the $j^{th}$ column vector of $\Phi$.

The UE can compare the entry values of $c_s$ to check or identify an entry having the highest absolute value at step 220. The index of the entry having the highest absolute value among the entries of $c_s$ is $j_{opt}$.

The UE can select a channel estimation candidate group based on $j_{opt}$ at step 230. The UE can calculate the union with $I_{s-1}$ stored at the previous step and defines the calculation result as $I_s$. It is assumed that $I_s$ is arranged in the ascending order.

The UE performs Zero Forcing (ZF) on the selected candidate group at step 240. At the 240 step, the currently calculated Is is entered as the input of the union and, for this purpose, a delay unit D is presented. The submatrix comprised of only the column vectors corresponding to the entries of Is among the column vectors of $\Phi$ is defined as $\Phi$I s. Assuming the system matrix of $\Phi$I s and input vector of y at the sth step, the output vector of the ZF receiver is defined as ĥI s.

The UE performs an interference canceling operation at step 250.

Afterward, the UE removes the output vector $\Phi_{I_s}\hat{h}_{I_s}$ from the received signal y. A value obtained by subtracting a contribution value of $\hat{h}_{I_s}$ from the received signal y is defined as $r_s$ and, for this purpose, the delay unit D is presented. The above described operations are repeated, and this repetition can stop when $\|r_s\|^2$ becomes less than a threshold value or when the entry with the greatest absolute value among the entries of $c_s$ becomes less than the threshold value.

Figure 3:
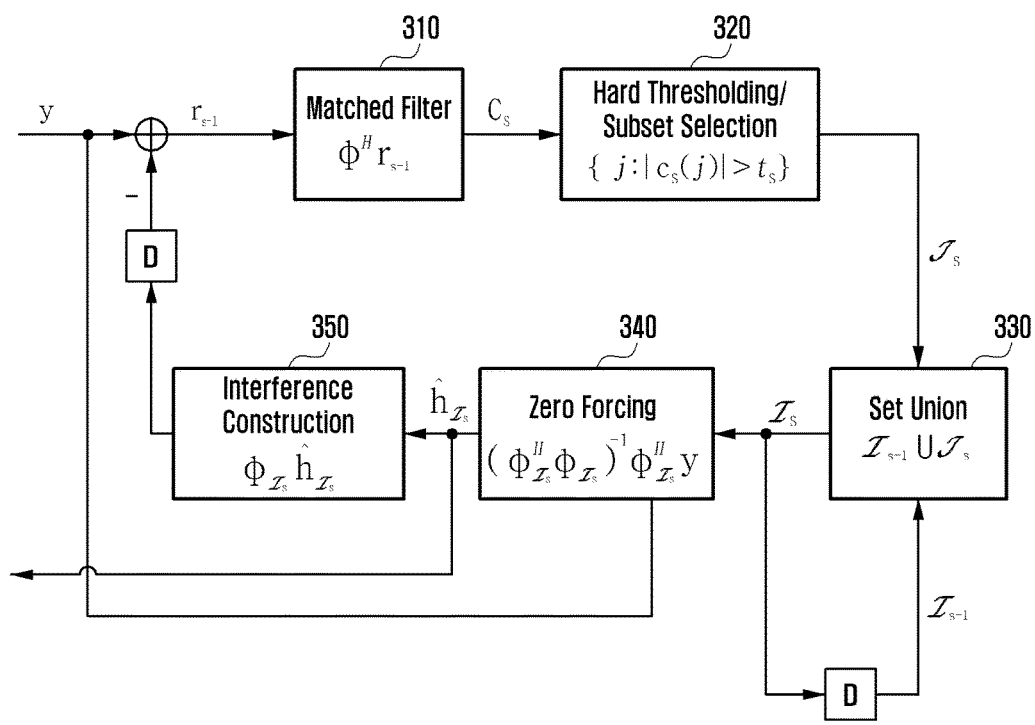
FIG. 3 is a circuit diagram illustrating a StOMP operation according to an embodiment of the present disclosure.

FIG. 3 is a circuit diagram illustrating a StOMP operation according to an embodiment of the present disclosure.

In reference to FIG. 3, a UE receives a signal from a base station at CRS RE positions, y denotes a received signal vector at the CRS Res, $r_{s-1}$ denotes a residual vector at $s^{th}$ step ($r_0$=y at s=1), and set $I_0$ is $I_0$=Ø.

The UE can pass the received signal vector y or the residual vector of the received signal vector at a certain step through a matched filter to generate an output at step 310. The $j^{th}$ entry of the matched filter output $c_s$ of $r_{s-1}$ at the $s^{th}$ (≥1) step is an entry of indicating the matching degree between $r_{s-1}$ and the $j^{th}$ column vector of $\Phi$.

The UE compares the entry values of $c_s$ to identify a set of the entries greater than a predetermined threshold value at step 320. A set of the entries of which absolute values are greater than $t_s$ among the entries of $c_s$ is $J_s$.

The UE can select a group of entries for channel estimation at step 330 based on $J_s$. The UE calculates the union with $I_{s-1}$ stored at the previous step and defines the calculation result as $I_s$.

The UE performs Zero Forcing (ZF) on the selected candidate group at step 340. At the $(s+1)^{th}$ step, the currently calculated $I_s$ is entered as the input of the union and, for this purpose, a delay unit D is presented. The submatrix comprised of only the column vectors corresponding to the entries of $I_s$ among the column vectors of $\Phi$ is defined as $\Phi_{I_s}$. Assuming the system matrix of $\Phi_{I_s}$ and input vector of y at the $s^{th}$ step, the output vector of the ZF receiver is defined as $\hat{h}_{I_s}$.

The UE performs an interference canceling operation at step 350.

Afterward, the UE removes the output vector $\Phi_{I_s}\hat{h}_{I_s}$ from the received signal y. A value obtained by subtracting a contribution value of $\hat{h}_{I_s}$ from the received signal y is defined as $r_s$ and, for this purpose, the delay unit D is presented. The above described operations are repeated, and this repetition can stop when $\|r_s\|^2$ becomes less than a threshold value or when the entry with the greatest absolute value among the entries of $c_s$ becomes less than the threshold value.

Figure 4:
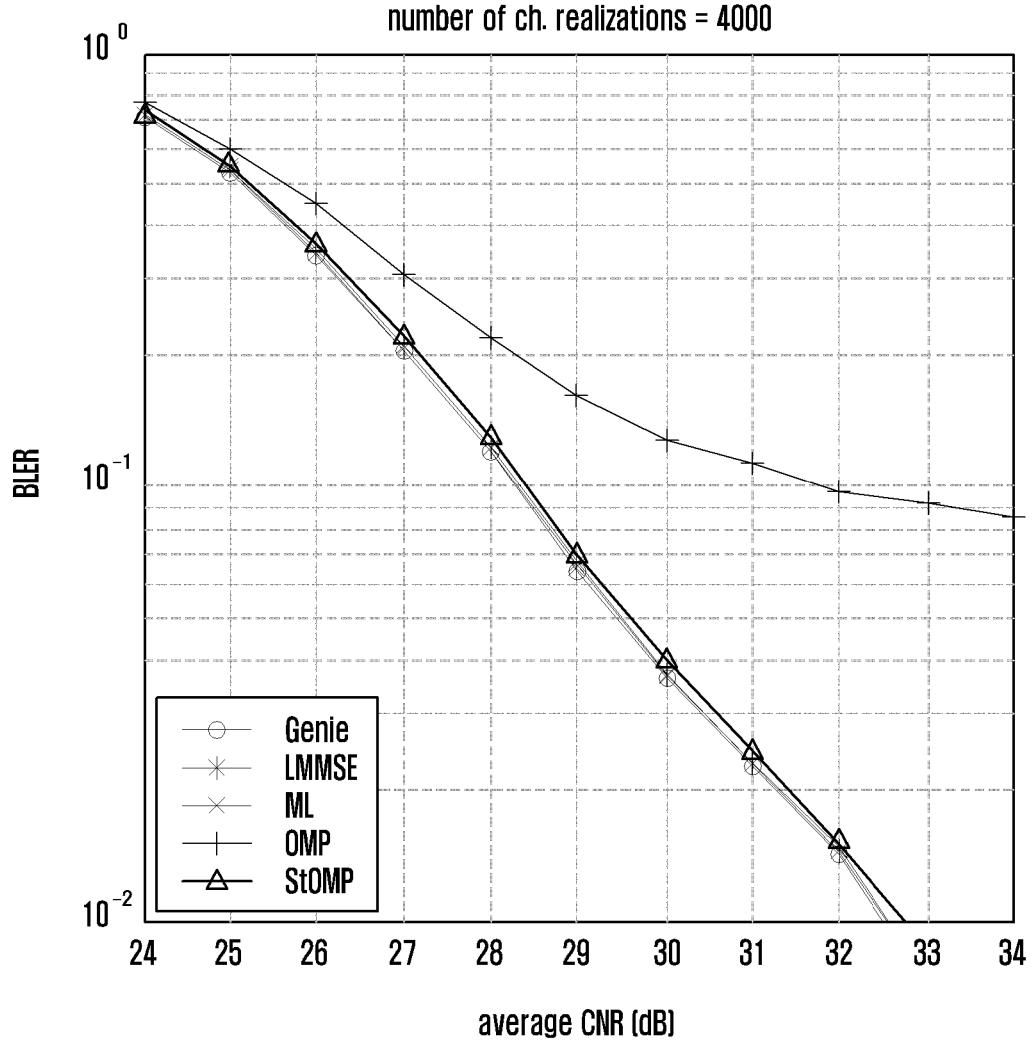
FIG. 4 is a graph showing block error rate (BLER) performance of a channel estimation method according to an embodiment of the present disclosure.

FIG. 4 is a graph showing BLER performance of a channel estimation method according to an embodiment of the present disclosure.

The channel is static, has delay and power profiles of [0 1 3 4 6 13]·$T_c$ and [0.3213 0.2552 0.3638 0.0509 0.0061 0.0027], is characterized by multiple paths independent from each other, and follows zero-mean normal distribution. The channel implemented to follow the above distribution is scaled such that the total power becomes 1. The system bandwidth is 10 MHZ, the modulation scheme is 256QAM, the number of PRBs scheduled to the UE is 50, and the transmission scheme is single-input single-output (SISO).

Since the transport block size is 48936 bits and 50 PRBs can contain 60000 bits, the effective channel code rate is 48936/60000=0.8156 and the channel decoder operates in the max log-map mode. The number of decoding repetitions of the turbo decoder is 8, and the simulation is performed with 4000 multipath channels. From the BLER curve, a significant performance gain is not expected to be obtained, although the base station performs retransmission in an erroneous situation because the OMP algorithm-based channel estimation method shows an error floor phenomenon in a high CNR regime. In contrast, the StOMP algorithm shows performance close to that of the optimal channel estimator (LMMSE scheme) throughout the entire operation region. Genie denotes the BLER curve when the channel is known.

The simulation result shows that there is no significant difference between multipath delays and that the OMP algorithm is inferior in performance to the StOMP algorithm as the cord rate approaches 1 with a high modulation scheme such as 256QAM.

Figure 5:
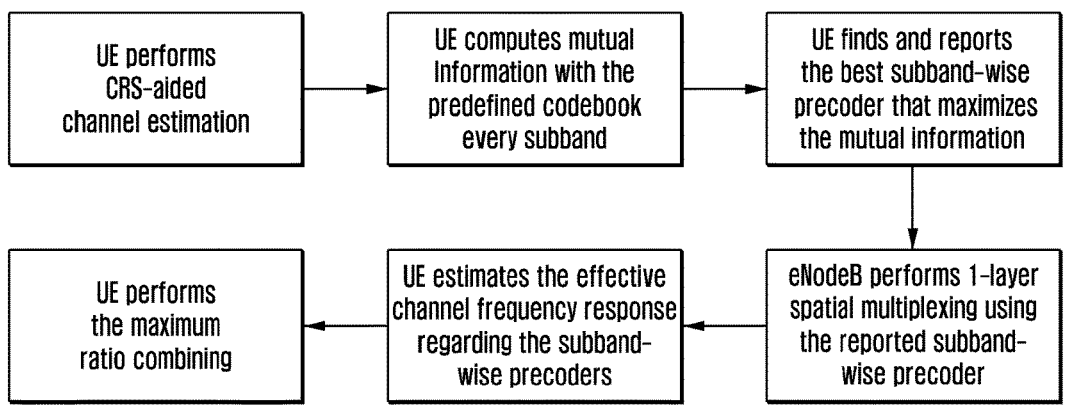
FIG. 5 is a diagram illustrating a channel estimation operation of a UE in Transmission Mode (TM) 4 or TM 6 according to an embodiment of the present disclosure.

FIG. 5 is a diagram illustrating a channel estimation operation of a UE in Transmission Mode (TM) 4 or TM 6 according to an embodiment of the present disclosure. In LTE, the CRS-based closed loop MIMO corresponds to TM 4 and TM 6. The UE configured to operate in TM 4 or TM 6 estimates the frequency domain channel based on CRS. The UE searches for a precoder per subband (6 PRBs) which maximizing the mutual information (MI) and reports the found precoder to the base station through PUSCH.

The LTE supports 4 precoders for the base station configured with 2 CRS ports and 1 layer and 16 precoders for the UE configured with 4 CRS ports. The UE determines the optimal number of layers and the optimal precoder for the number of layers based on CRS.

The Channel Frequency Response (CFR) at the $RE^k$ to which $CRS^u$ is mapped in the OFDM symbol n transmitted from the transmit antenna port u (u=0, . . . , $N_t$-1) to the receive antenna v (v=0, . . . , $N_r$-1) can be expressed as follows:

$$\eta_{u,v}(n, k) = \sum_{l=0}^{L-1} h_{u,v}(l) e^{-j2\pi kl/N} \quad (20)$$

The effective CFR can be expressed as follows:

$$\omega_v(n, k) = \sum_{u=0}^{N_t-1} \eta_{u,v}(n, k) p_u(k) \quad (21)$$

Here, $p_u(k)$ denotes the u th entry of the precoder vector. It should be noted that the same precoder is applied to REs of one subband (12×14×6=1008 REs) with the exception of the CRS REs. In the case of using 1 layer, assuming Maximum Ratio Combining (MRC) for best combination of the REs to which the Physical Downlink Shared Channel (PDSCH) received through $N_r$ receive antennas is mapped, SNR(n,k) at RE k of OFDM symbol n is expressed as follows:

$$SNR(n, k) = \frac{\sum_{v=0}^{N_r-1} |\omega_v(n, k)|^2}{\sigma_z^2} \quad (22)$$

Assuming the function of calculating mutual information (MI) of REs (n,k) with the exception of CRS REs is θ, it is possible to calculate the MI using SNR(n,k) and modulation order M. Since the receiver does not know the real channel, the precoder per best subband can be calculated as follows:

$$p^*(k) = \underset{p(k)}{\operatorname{argmax}} \sum_{\substack{n,k \\ non-crs}} \theta(SNR(n, k), M) \quad (23)$$

where (n,k) denotes OFDM symbol and subcarrier indices of the RE belonging to one subband, $$SNR(n, k) = \frac{\sum_{v=0}^{N_r-1} |\hat{w}_v(n, k)|^2}{\sigma_z^2}, \quad (24)$$

and $$w_v(n, k) = \sum_{u=0}^{N_t-1} \hat{\eta}_{(u,v)}(n, k) p_u(k). \quad (25)$$

In the equation (25), $\hat{\eta}_{u,v}(n,k)$ denotes an estimated value of CFR at OFDM symbol n and RE k to which PDSCH is transmitted from the transmit antenna port u to the received antenna v, and is derived from the estimated value of CIR $\hat{h}_{u,v}(l)$ as follows:

$$\hat{\eta}_{u,v}(n, k) = \sum_{l=0}^{L-1} \hat{h}_{u,v}(l) e^{-j2\pi k l/N}. \quad (26)$$

Figure 6:
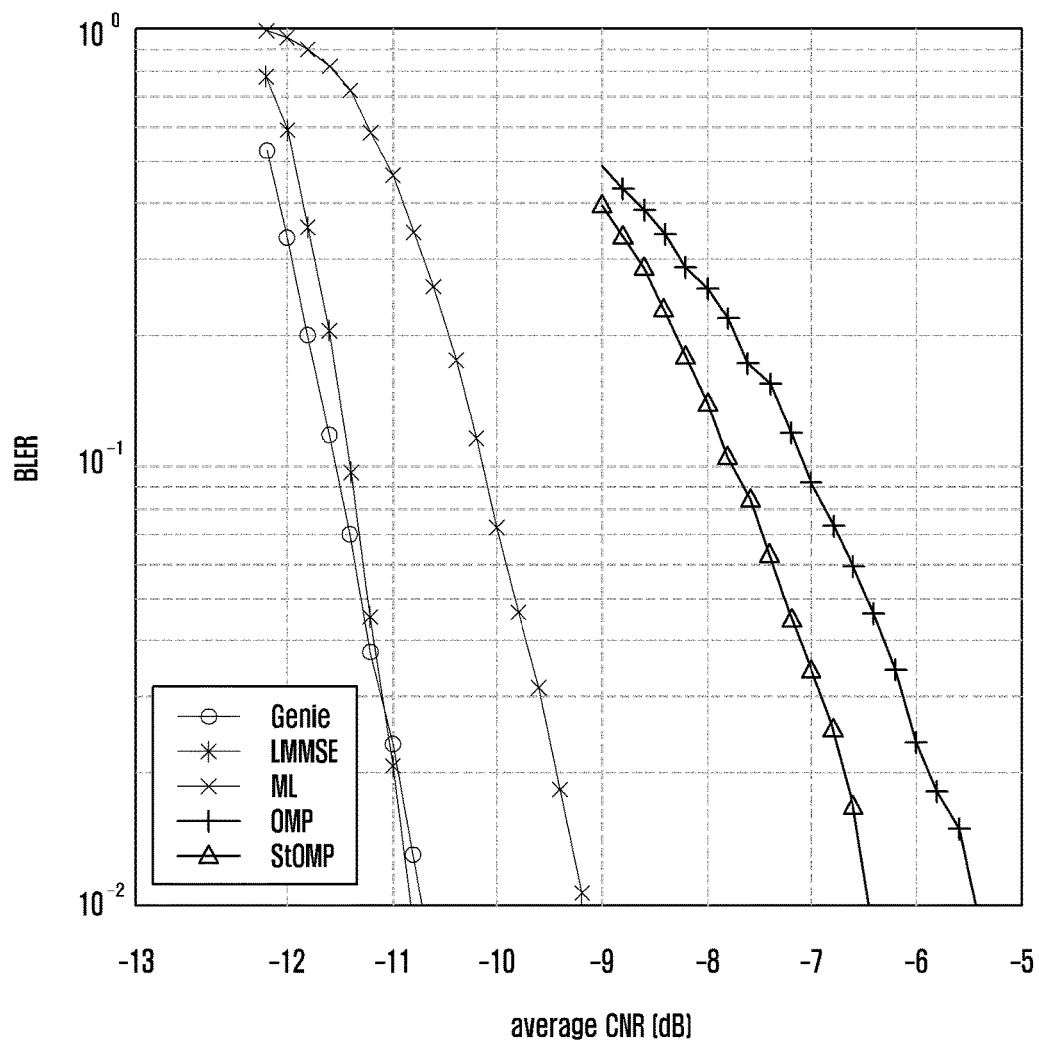
FIG. 6 is a graph showing BLER performance of multi-input channel estimation methods according to an embodiment of the present disclosure.

FIG. 6 is a graph showing BLER performance of multi-input channel estimation methods according to an embodiment of the present disclosure. The channel is a Ped. B channel which is static and has delay and power profiles of [0 0.2 0.8 1.2 2.3 3.7]·μs and [0.4057 0.3298 0.1313 0.0643 0.0673 0.0017] respectively, and is characterized by multiple paths independent from each other and follows zero-mean normal distribution.

A 4×1 Multiple-Input Single-output (MISO) channel is considered, and the inter-antenna correlation follows high correlation of the 3GPP TS 36.104. For Tx and Rx composite filters, a sinc function with 9 taps is considered. The channel implemented to follow the above distribution is scaled such that the total power becomes 1 in the ADC sample space. The system bandwidth is 10 MHz, the modulation scheme is QPSK, and the number of PRBs scheduled to the UE is 50. Since the transport block size is 1384 bits and 50 PRBs can contain 13600 bits, the effective channel code rate is 1384/13600=0.1018, and the channel decoder operates in the max long-map mode. The number of decoding repetitions of the turbo decoder is 8, and the simulation is performed with 4000 multipath channels. The BLER curve shows that the StOMP-based channel estimation method is inferior by as much as 2.5 dB in performance compared with the ML-based channel estimation method, and there is a need of a more-enhanced channel estimation method with a performance that approaches that of the ML-based channel estimation method.

The channel estimation method of the present disclosure is capable of further obtaining array gain and diversity gain through precoding in the MIMO system supporting precoding at the PDSCH REs. Meanwhile, the CRS REs are not precoded. The PDSCH reception performance enhancement contributes to reducing the operation region of a given MCS and, at this time, the StOMP scheme shows channel estimation performance degradation in the operation region of a decreasing CNR.

An embodiment of the present disclosure is directed to a Block StOMP scheme for achieving a performance close to the ideal performance even in an operation region decreased by precoding using the characteristic that the non-zero entry positions are constant in consideration of the channel vector between the transmit and receive antennas in the MIMO system.

The block StOMP algorithm estimates MIMO CIR through iteration in consideration of the common support of MIMO channels. It is possible to estimate CFR and effective CFR using the estimated CIR.

Figure 7:
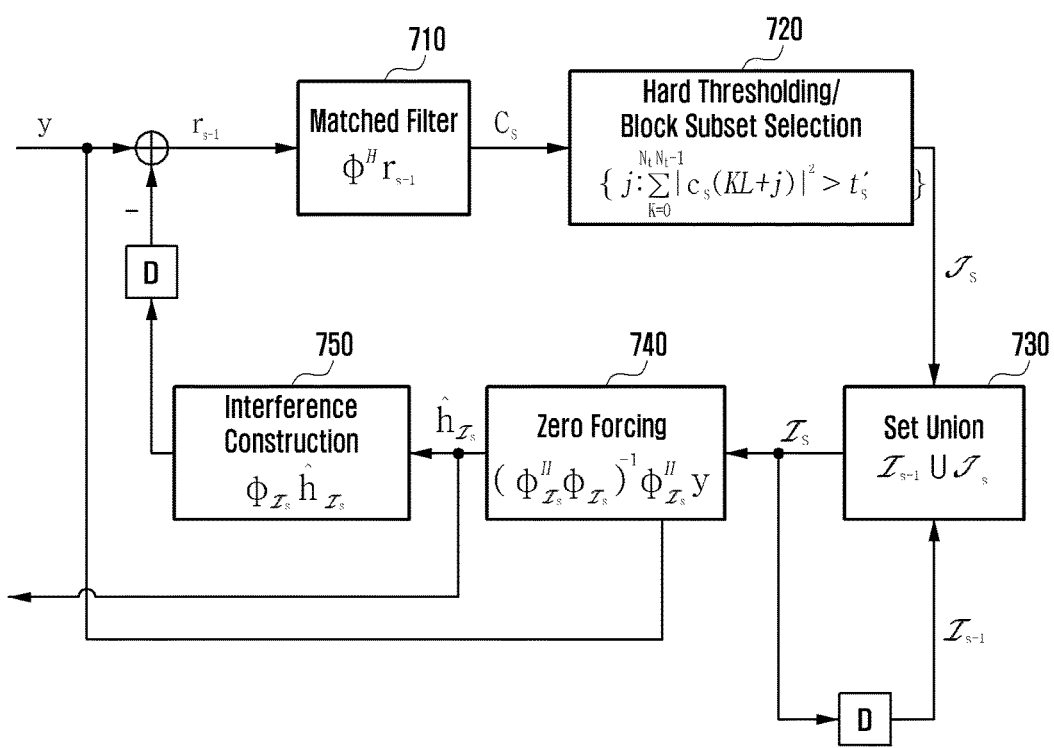
FIG. 7 is a diagram illustrating a block StOMP operation according to an embodiment of the present disclosure.

FIG. 7 is a diagram illustrating a block StOMP operation according to an embodiment of the present disclosure.

In reference to FIG. 7, a UE receives a signal from a base station at reference signal (e.g., CRS) REs. y denotes a received signal vector at the CRS REs. $r_{s-1}$ denotes a residual vector at the $s^{th}$ step, and $r_0$=y and $I_0$=Ø when s=1.

The UE can pass the received signal vector y or the residual vector of the received signal vector at a certain step through a matched filter to generate an output at step 710. The $i^{th}$ entry of the matched filter output $c_s$ of $r_{s-1}$ at the $s^{th}$ (≥1) step is an entry of indicating the matching degree between $r_{s-1}$ and the $i^{th}$ column vector of Φ.

The UE can organize the entries having the same channel tap index into a group among the entries of $c_s$ and compare the energy sum of the entries belonging to the group with a predetermined threshold value at step 720. In an embodiment of the present disclosure, the terms "group" and "block" are used interchangeably with the same meaning. The UE can organize the entries belonging to the same tap, among the entries, into one group.

The number of entries of $c_s$ is $LN_rN_t$, and the $LN_rN_t$ entries distributed at an interval of L are defined as a block. $N_r$ denotes the number of receive antennas, and $N_t$ denotes the number of CRSs. In the same meaning, $N_t$ denotes the number of transmit antenna ports transmitting CRS. L denotes the maximum number of taps. The taps can correspond the CRS transmission or reception paths. The same tap can have the same delay. The CRSs transmitted through different antenna ports can be received by the UE as entries having different delays through different paths. It can be possible to say that the entries having the same delay, among the entries corresponding to the CRSs received by the UE, belong to the same tap and, in an embodiment of the present disclosure, the entries belonging to the same tap are organized (blocked) into a channel estimation candidate group. Then $c_s$ has L blocks.

The entries belonging to the same tap are organized (blocked) in the above-described manner.

The UE can sum the energies of the organized group entries and determine whether the energy sum of the group is greater than a predetermined threshold value. Although the group is organized to sum the entries belonging to the same tap, it can also be possible to sum the energies of part of the entries belonging to the same tap and compare the energy sum with the threshold value.

Here, the per-block energy being compared with the threshold value can be the sum of absolute values of the entries belonging to the block, the sum of squares of the absolute values, the sum of third powers of the absolute values, or the sum of fourth powers of the absolute values. The threshold $t'_s$ can changes every step or according to the number of transmit antennas of the base station.

The UE can select a channel estimation candidate group based on $J_s$ at step 730. A set of the blocks of which the power sum (i.e., energy) of the entries in the $j^{th}$ block (j=0, ..., L−1) of $c_s$ is greater than a predetermined threshold $t'_s$ is $J_s$; and the union with the $I_{s-1}$ stored at the previous step is calculated, and the calculation result is defined as $I_s$.

The UE perform ZF on the selected candidate group at step 740. In the embodiment of FIG. 7, it can be possible to consider the entries which are not used for channel estimation as performed in the embodiments of FIGS. 2 and 3. In the embodiments of FIGS. 2 and 3, in channel estimation each entry is compared with the threshold to rule out the entries of which values are not the greatest or the entries less than the threshold value; however, in the embodiment of FIG. 7, if the energy sum of the entries of the group is greater than the threshold, all of the entries belonging to the group can be considered as channel estimation target entries.

The entries belonging to the same tap are likely to pass the same path and likely to be the entries corresponding to the reference signals rather than interference and noise. In the embodiment of FIG. 7, the entries for use in channel estimation are determined per group; thus, the entries regarded as interference or noise and ruled out in channel estimation in the embodiments of FIGS. 2 and 3, even though they are entries corresponding to the reference signals, can be considered in the channel estimation, which results in improvement of channel estimation performance and mitigation of performance degradation.

Suppose that $I_s$ is arranged in the ascending order. The currently obtained $I_s$ is entered as the input of the union at the (s+1)th step and, for this purpose, a delay unit D is presented. The submatrix comprised of only the column vectors corresponding to the entries of $I_s$ among the column vectors of $\Phi$ is defined as $\Phi_{I_s}$. Assuming the system matrix of $\Phi_{I_s}$ and input vector of y at the $s^{th}$ step, the output vector of the ZF receiver is defined as $\hat{h}_{I_s}$.

The UE performs a noise canceling operation at step 750.

Afterward, the UE removes the output vector $\Phi_{I_s}\hat{h}_{I_s}$ from the received signal y. A value obtained by subtracting a contribution value of $\hat{h}_{I_s}$ from the received signal y is defined as $r_s$ and, for this purpose, the delay unit D is presented.

The above described operations are repeated, and this repetition can stop when $\|r_s\|^2$ becomes less than a threshold value or when the entry with the greatest absolute value among the entries of $c_s$ becomes less than the threshold value.

The MIMO CIR vector $\hat{h}$ estimated using the block StOMP method has non-zero values at the indices included in the set $I_s$ and zero values at the indices included in the complement set of $I_s$. It can be possible to estimate CFR and effective CFR with the entries of $\hat{h}$ using equations (26) and (25).

Figure 8:
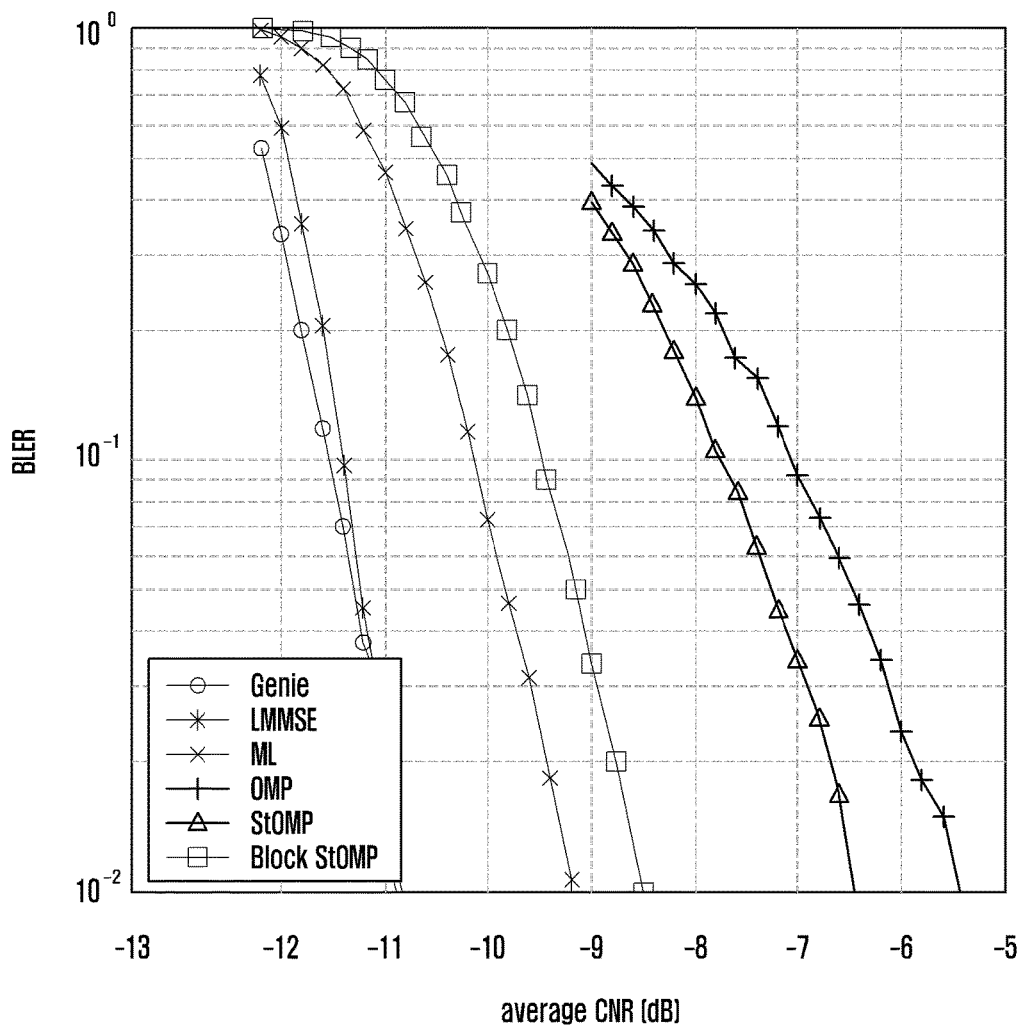
FIG. 8 is a graph showing BLER performances of channel estimation methods according to an embodiment of the present disclosure.

FIG. 8 is a graph showing the BLER performances of channel estimation methods. The channel is a Ped. B channel which is static, and has delay and power profiles of [0 0.2 0.8 1.2 2.3 3.7]·μs and [0.4057 0.3298 0.1313 0.0643 0.0673 0.0017] respectively and is characterized by multiple paths independent from each other and follows zero-mean normal distribution. A 4×1 Multiple-Input Single-output (MISO) channel is considered, and the inter-antenna correlation follows high correlation of the 3GPP TS 36.104. For Tx and Rx composite filters, a sinc function with 9 taps is considered. The channel implemented to follow the above distribution is scaled such that the total power becomes 1 in the ADC sample space. The system bandwidth is 10 MHz, the modulation scheme is QPSK, and the number of PRBs scheduled to the UE is 50. Since the transport block size is 1384 bits and 50 PRBs can contain 13600 bits, the effective channel code rate is 1384/13600=0.1018, and the channel decoder operates in the max long-map mode. The number of decoding repetitions of the turbo decoder is 8, and the simulation is performed with 4000 multipath channels.

The BLER curve shows that the block StOMP-based channel estimation method obtains a performance gain of 1.6 dB in comparison with the StOMP-based channel estimation method and has a performance degradation equal to or 1 less than dB in comparison with the ML-based channel estimation method.

The present disclosure is capable of obtaining a performance close to the ideal performance even in the operation region decreased by precoding in the MIMO system.

Figure 9:
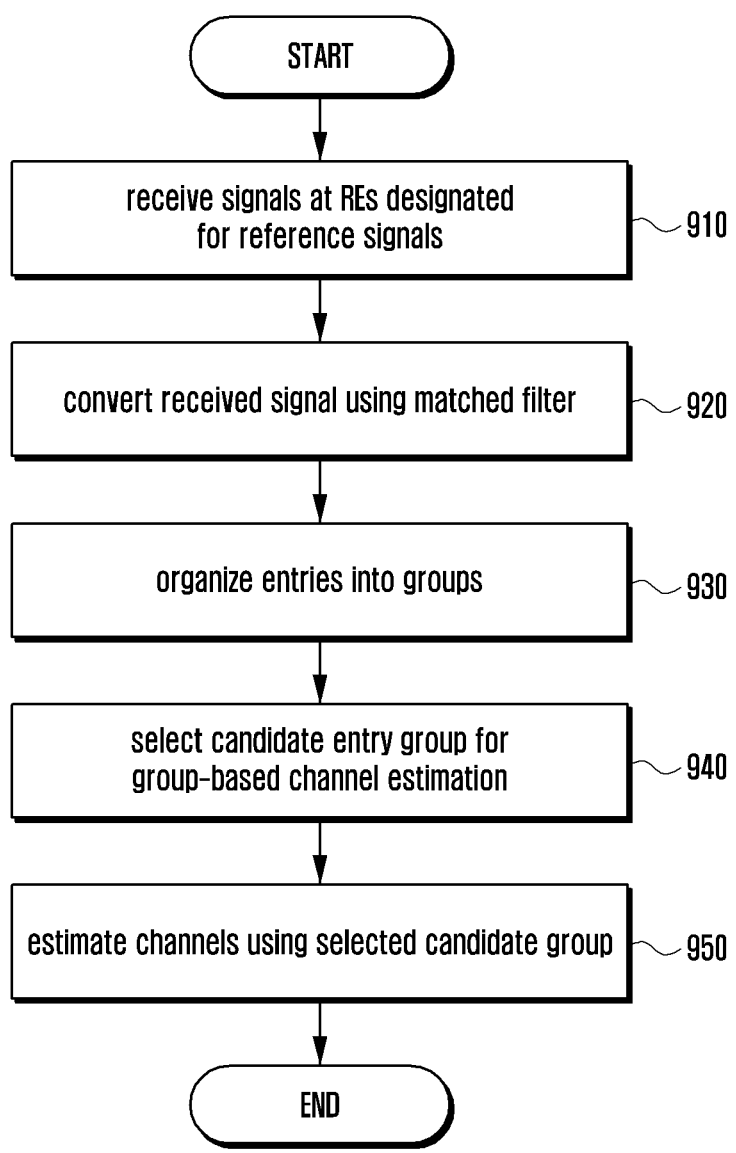
FIG. 9 is a flowchart illustrating a channel estimation method of a UE according to an embodiment of the present disclosure.

FIG. 9 is a flowchart illustrating a channel estimation method of a UE according to an embodiment of the present disclosure.

The UE can receive a signal at reference signal RE positions at step 910. The reference signal can be a CRS transmitted in one or more subframes. The received signal can correspond to an index of a subcarrier to which the CRS is mapped in the frequency domain. The received signal y means a received signal vector at the reference signal Res, $r_{s-1}$ is a residual vector as the $s^{th}$ step, and $r_0$=y when s=1.

The UE can convert the received signal at step 920. The UE can convert the frequency-domain received signal to a time-domain signal. The UE can use a matched filter to convert the frequency-domain received signal to the time-domain signal. The matched filter can be represented by $\Phi$. Through the operation of step 920, it can be possible to acquire the output $c_s$. The $i^{th}$ entry of the output $c_s$ is an entity indicating the matching degree between $r_{s-1}$ and the $i^{th}$ column vector of $\Phi$.

The UE can organize the entries of $c_s$ into a group at step 930. The UE can organize the entries belonging to the same tap into a group. If the entries belong to the same tap, this means the entries have the same delay. The group can be comprised of the entries of the same tap. In an exemplary case that the base station uses 4 transmit antennas for CRS transmission, one group can include 4 entries with the same tap among the entries corresponding to the CRS transmitted by the respective transmit antennas.

The UE can select a candidate entry group for channel estimation based on the group organization at step 940. The UE can determine or generate the candidate entry group.

The UE can calculate the energy sum of the entries included in the group. The UE can select the candidate entry group based on the energy sum and a predetermined threshold. Step 930 can be omitted and, in this case, the UE can determine whether the absolute values of the entries of $c_s$ are greater than a predetermined threshold. The UE can organize the entries of which the absolute values are greater than the threshold into the candidate entry group. The entries of which the absolute values are greater than the threshold and which are included in the group can be selected into the candidate entry group.

The UE can perform channel estimation using the candidate entry group at step 950. The UE can perform frequency domain conversion on the selected candidate entry group. For example, the UE can perform ZF on the selected candidate entry group. The UE can perform channel estimation by reflecting the converted frequency-domain signal to the received signal.

Figure 10:
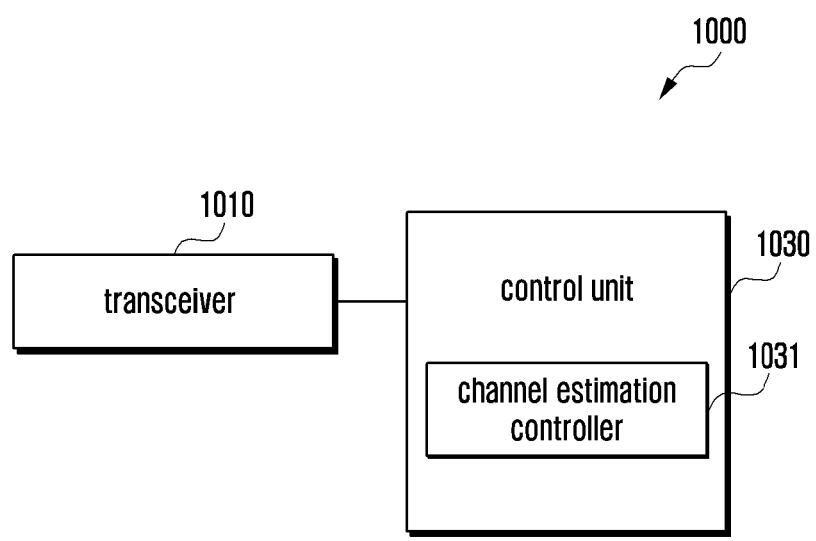
FIG. 10 is a block diagram illustrating a configuration of a terminal according to an embodiment of the present disclosure.

FIG. 10 is a block diagram illustrating a configuration of a terminal according to an embodiment of the present disclosure.

In reference to FIG. 10, the UE 1000 can include a transceiver 1010 for transmitting and receiving a signal and a control unit 1030 for controlling overall operations of the UE 1000. The control unit 1030 can include a channel estimation controller 1031. The channel estimation controller 1031 can control the operations concerning the channel estimation as a part of the control unit 1030. The operations of the channel estimation controller 1031 can be performed by the control unit 1030.

The control unit 1030 can acquire the received signal at the reference signal REs, convert the received signal to time-domain entries using a matched filter, organize the entries output from the matched filter into groups by delay, determine whether the energy sum of the entries of each group is greater than a predetermined threshold, and select the entries belonging to the group of which the energy sum is greater than the threshold into a candidate group for channel estimation.

The reference signal can be CRS. In the case of applying the proposed channel estimation to a base station, the reference signal can be SRS.

The received signal can be transmitted through at least two transmit antenna ports, and the organized group can be a group of the entries having the same delay among the reference signal entries transmitted by respective transmit antennas.

The control unit 1030 can control the UE to perform ZF on the entries belonging to the candidate group and to remove output from the received signal.

The control unit 1030 can also control the UE to perform StOMP on the entries belonging to the candidate group.

The control unit 1030 can also control the UE to perform every step repeatedly on the residual vector obtained by removing the ZF output from the received signal. The control unit 1030 can also control to repeat every step until the size of the residual vector becomes equal to or less than a predetermined threshold or a predetermined number of times.

The operations of the UE 1000 and the control unit 1030 are not limited to the above description made with FIG. 10, and they can include all UE operations described with reference to from FIG. 1 to FIG. 9.

Figure 11:
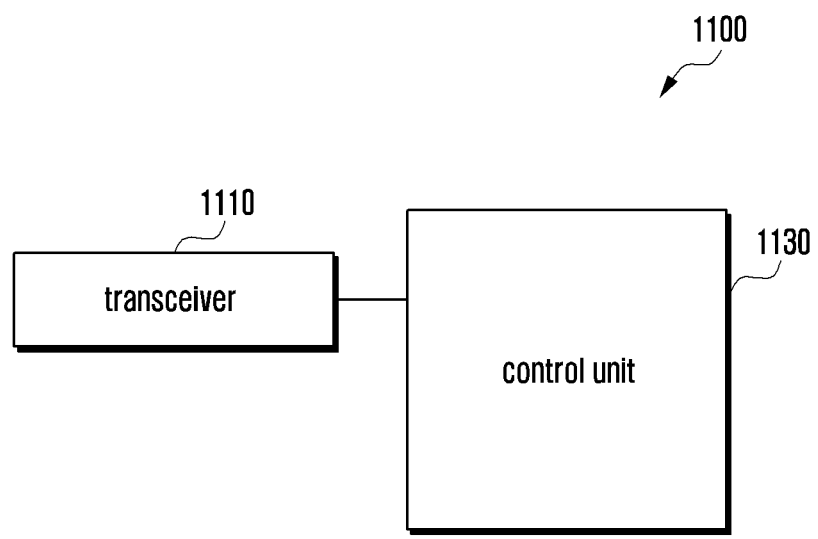
FIG. 11 is a block diagram illustrating a configuration of a base station according to an embodiment of the present disclosure.

FIG. 11 is a block diagram illustrating a configuration of a base station according to an embodiment of the present disclosure.

Referring to FIG. 11, the base station 1100 can include a transceiver 1110 for transmitting and receiving signals and a control unit 1130 for controlling overall operations of the base station.

The control unit 1130 can control the base station to generate reference signals, map the reference signals to resources, and transmit the reference signals to a UE. The control unit 1130 can control the base station to receive a measured channel estimation result from the UE and to transmit downlink channels to the UE based on the channel estimation result.

The operations of the base station 1100 and the control unit 1130 are not limited to the description made with FIG. 11, and they can include the operations of the base station that have been described with reference to FIG. 1 to FIG. 9.

As described above, the channel estimation method and apparatus of the present disclosure for use in a wireless communication system is advantageous in terms of improving channel estimation performance.

Although various embodiments of the present disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A channel estimation method of a terminal, the method comprising:
   receiving downlink signals at resource elements (REs) for reference signals from a base station;
   converting the received downlink signals to time-domain entries using a matched filter;
   organizing time-domain entries of output from the matched filter into groups based on delay;
   determining whether an energy sum of time-domain entries of each group is greater than a first threshold;
   selecting the time-domain entries belonging to a group of which the energy sum is greater than the first threshold into a candidate group for channel estimation;
   performing zero forcing (ZF) on the time-domain entries belonging to the candidate group; and
   removing ZF output from the received downlink signals.

2. The method of claim 1, wherein the reference signals are cell-specific reference signals (CRS).

3. The method of claim 1, wherein the received downlink signals are transmitted through at least two antenna ports, and the group is organized by selecting time-domain entries having the same delay among reference signal time-domain entries transmitted by respective transmit antennas.

4. The method of claim 1, further comprising performing a stage-wise orthogonal matching pursuit (StOMP) on the time-domain entries belonging to the candidate group.

5. The method of claim 1, further comprising repeating every step onto a residual vector obtained by removing the ZF output from the received downlink signals.

6. The method of claim 5, further comprising repeating every step for less than a predetermined number of times until a size of the residual vector becomes less than a second threshold.

7. A terminal comprising:
   a transceiver configured to transmit and receive a signal; and
   a controller configured to:
      receive downlink signals at resource elements (REs) for reference signals from a base station, convert the received downlink signals to time-domain entries using a matched filter, organize time-domain entries of output from the matched filter into groups based on delay, determine whether an energy sum of time-domain entries of each group is greater than a threshold, select the time-domain entries belonging to the group of which the energy sum is greater than the threshold into a candidate group for channel estimation, perform zero forcing (ZF) on the time-domain entries belonging to the candidate group, and remove ZF output from the received downlink signals.

8. The terminal of claim 7, wherein the reference signals are cell-specific reference signals (CRS).

9. The terminal of claim 7, wherein the received downlink signals are transmitted through at least two antenna ports, and the group is organized by selecting the time-domain entries having the same delay among reference signal time-domain entries transmitted by respective transmit antennas.

10. The terminal of claim 7, wherein the controller is configured to perform a stage-wise orthogonal matching pursuit (StOMP) on the time-domain entries belonging to the candidate group.

11. The terminal of claim 7, wherein the controller is configured to repeat every step onto a residual vector obtained by removing the ZF output from the received downlink signals.

12. The terminal of claim 11, wherein the controller is configured to control repeating every step for less than a predetermined number of times until a size of the residual vector becomes less than a threshold.

13. A non-transitory computer readable medium comprising program code, that when executed by at least one processor, causes the at least one processor to:

receive downlink signals at resource elements (REs) for reference signals from a base station;

convert the received downlink signals to time-domain entries using a matched filter;

organize time-domain entries of output from the matched filter into groups based on delay;

determine whether an energy sum of time-domain entries of each group is greater than a first threshold;

select the time-domain entries belonging to a group of which the energy sum is greater than the first threshold into a candidate group for channel estimation perform zero forcing (ZF) on the time-domain entries belonging to the candidate group; and remove ZF output from the received downlink signals.

14. The non-transitory computer readable medium of claim 13, wherein the reference signals are cell-specific reference signals (CRS).

15. The non-transitory computer readable medium of claim 13, wherein the received downlink signals are transmitted through at least two antenna ports, and the group is organized by selecting time-domain entries having the same delay among reference signal entries transmitted by respective transmit antennas.

16. The non-transitory computer readable medium of claim 13, wherein the program code, when executed by at least one processor, further causes the at least one processor to perform a stage-wise orthogonal matching pursuit (StOMP) on the time-domain entries belonging to the candidate group.

17. The non-transitory computer readable medium of claim 13, wherein the program code, when executed by at least one processor, further causes the at least one processor to repeat every step onto a residual vector obtained by removing the ZF output from the received downlink signals.

18. The non-transitory computer readable medium of claim 17, wherein the program code, when executed by at least one processor, further causes the at least one processor to repeat every step for less than or a predetermined number of times until a size of a residual vector becomes less than a second threshold.

* * * * *